Figure 1:
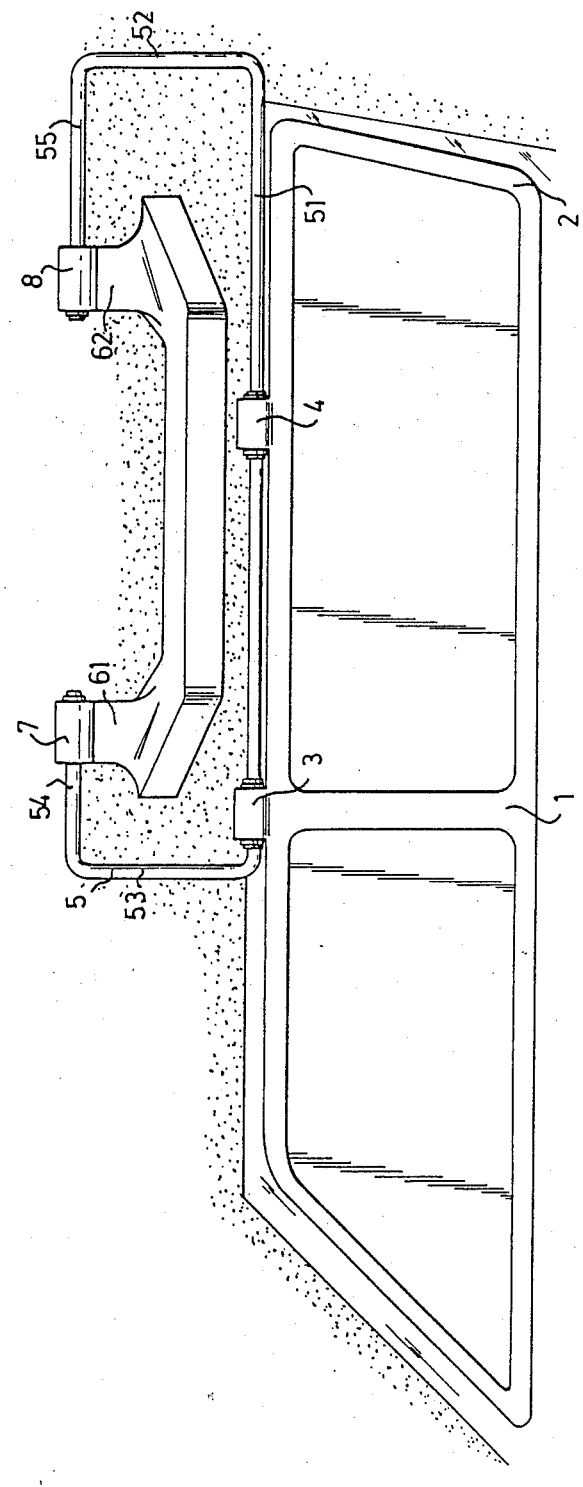

United States Patent [19]

Svensson

[11] Patent Number: 4,792,177
[45] Date of Patent: Dec. 20, 1988

[54] SUN VISOR FOR A VEHICLE SIDE WINDOW

[75] Inventor: E. Gunnar Svensson, Malung, Sweden

[73] Assignee: Autopart Sweden AB, Malung, Sweden

[21] Appl. No.: 103,747

[22] Filed: Oct. 1, 1987

[30] Foreign Application Priority Data

Oct. 7, 1986 [SE] Sweden .................................. 8604266

[51] Int. Cl.$^4$ ................................................ B60J 3/02
[52] U.S. Cl. ................................... 296/152; 296/97.5; 160/DIG. 3
[58] Field of Search ................. 296/97 R, 97 K, 97 G, 296/97 B, 97 E; 160/DIG. 3

[56] References Cited

U.S. PATENT DOCUMENTS 1,717,185  6/1929  Caldwell ........................... 296/97 K
4,130,317 12/1978  Lai ..................................... 296/97 R

FOREIGN PATENT DOCUMENTS 1555865  2/1971  Fed. Rep. of Germany .
1362640  4/1964  France .
354812  3/1973  Sweden .

Primary Examiner—Robert B. Reeves
Assistant Examiner—Brian Sells
Attorney, Agent, or Firm—Young & Thompson

[57] ABSTRACT

A sun visor for a vehicle side window, in which the sun visor (1) is pivotally affixed to a courtesy handle (6) in the vehicle. The courtesy handle (6) has hinge sleeves (7, 8) to support complementary pivot axles (54, 55) in the sun visor (1). The free ends (54, 55) of a C-shaped clamp (5) are pivotally fitted in the hinge sleeves (7, 8) of the courtesy handle (6). The base (51) of the clamp (5), which is parallel with the free ends (54, 55), pivotally supports the sun visor (1) by hinge sleeves (3, 4), provided in the sun visor.

2 Claims, 2 Drawing Sheets

SUN VISOR FOR A VEHICLE SIDE WINDOW

The present invention relates to a sun visor for a side window in a vehicle.

In order to shield the driver and the passengers from sun rays, coming in from the side, it is known to provide vehicles with supplementary sun visors, which often are transparent in order not to risk the road safety and in order to permit discovery of passing cars or obstructions.

One problem with sun visors for side windows in vehicles is that it is difficult to find suitable fixing points for mounting them, since one wants to avoid, to the fullest extent possible, to tap new holes in the vehicle body.

The object of the present invention is to solve this problem.

According to the present invention this is obtained by a sun visor having the characteristic features defined in the present claim 1.

Figure 2:
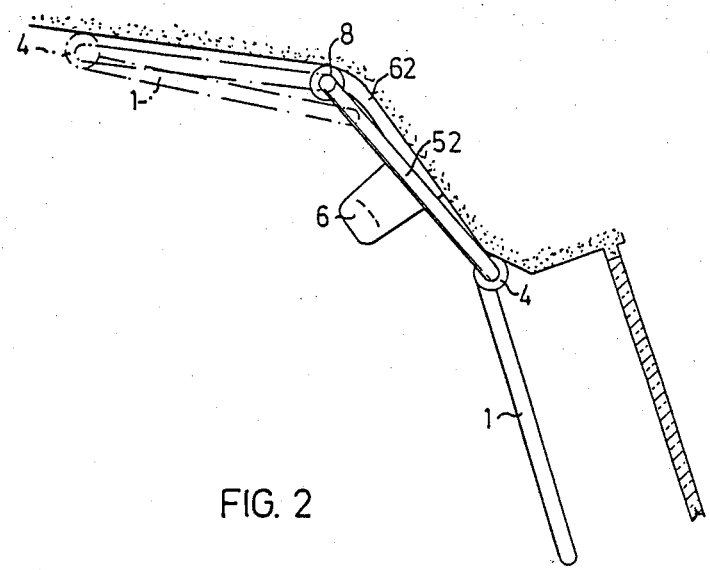

The present invention will now be described with reference to the accompanying drawings in which FIG. 1 shows a sectional view, from inside a vehicle, of a sun visor according to a preferred embodiment of the invention, and FIG. 2 shows the sun visor of FIG. 1 from the back.

The sun visor 1 shown in the Figures is of a transparent type and, in the preferred embodiment, consists of a frame 2, which supports a thin material with net structure. In an alternative embodiment, not shown, the sun visor may instead consist of plexiglass disc with inked bar pattern.

On its upper edge the sun visor 1 comprises two separate hinge sleeves 3,4. These hinge sleeves cooperate with the straight base 51 of a C-shaped clamp 5 in such a manner that the sun visor is pivoting about this base. The free ends 54,55, directed towards each other, and extending from the clamp legs 52,53 parallel to the base 51, are pivotally fixed in hinge sleeves 7,8 of a courtesy handle 6, which is fixed in the vehicle body in a conventional manner.

In FIG. 2 the sun visor of the invention is shown from the back and with continuous lines in its position of use, shown in FIG. 1. The sun visor's position of rest is shown with dashed lines.

As appears from the figures the sun visor does not have an effect on the ordinary function of the courtesy handle, i.e. the latter is easy to grip whether the sun visor is in its position of rest or in its position of use. Furthermore, the angular adjustability of the clamp in relation to the sun visor has the result that the turning down of the sun visor requires little space. Additionally, this angular adjustability allows the adjustment of the sun visor to be corrected even after the hinge sleeves 3,4 have contacted the vehicle body at the turning down from the position of rest. In order to make this possible the length of the clamp legs 52,53 must then be such that the hinge sleeves 3,4 of the sun visor, in the position of use, essentially are located in the upper edge of the doorway of the vehicle body, as shown in the figures.

Thus, the present invention provides a combined sun visor/courtesy handle which is easy to mount in existing holes in the vehicle body. Furthermore, the constructions of the invention demands little space and is attractive also from an aesthetical point of view.

Of course several modifications are possible within the scope of the invention. For example, the invention is applicable to sun visors of non-transparent type. Moreover, in certain cases, the sun visor need not be pivoting on the clamp, in which case the clamp may constitute an integrated part of the sun visor. If one wishes to design the fixing of the sun visor so that it may be applied to existing courtesy handles, it is of course possible to design appropriate fixing elements for this purpose.

Therefore, the scope of the invention shall be limited merely by the subject matter of the enclosed claims.

I claim:

1. A sun visor for a vehicle side window, in which the sun visor (1) is pivotally affixed to a courtesy handle (6) in the vehicle, the courtesy handle (6) having hinge sleeves (7, 8) to support complementary pivot axles (54, 55) in the sun visor (1).

2. A sun visor according to claim 1, in which the free ends (54,55) of a C-shaped clamp (5) are pivotally fitted in the hinge sleeves (7,8) of the courtesy handle (6) and the base (51) of the clamp (5), which is parallel with the free ends (54,55), pivotally supports the sun visor (1) by hinge sleeves (3,4), provided in the sun visor.

* * * * *